(12) United States Patent
Wheeler et al.

(10) Patent No.: US 8,804,690 B1
(45) Date of Patent: Aug. 12, 2014

(54) PACKET EXCHANGE ARBITRATION FOR COEXISTING RADIOS

(71) Applicant: Marvell International Ltd., Hamilton (BM)

(72) Inventors: Todd Steven Wheeler, San Jose, CA (US); Gladys Yuen Yan Wong, Fremont, CA (US); Robert Mack, San Jose, CA (US); Ken Kinwah Ho, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/923,949

(22) Filed: Jun. 21, 2013

Related U.S. Application Data

(63) Continuation of application No. 12/732,036, filed on Mar. 25, 2010, now Pat. No. 8,472,427.

(60) Provisional application No. 61/166,985, filed on Apr. 6, 2009.

(51) Int. Cl.
*H04W 72/10* (2009.01)

(52) U.S. Cl.
USPC ............................ 370/348; 370/462; 710/241

(58) Field of Classification Search
None
See application file for complete search history.

(56) References Cited

U.S. PATENT DOCUMENTS

| | | | |
|---|---|---|---|
| 4,337,463 A | 6/1982 | Vangen | |
| 7,239,882 B1 | 7/2007 | Cook | |
| 7,342,895 B2 | 3/2008 | Serpa et al. | |
| 7,595,768 B2 | 9/2009 | Li et al. | |
| 7,957,340 B2 | 6/2011 | Choi et al. | |
| 7,966,036 B2 | 6/2011 | Kojima | |
| 8,072,913 B2 | 12/2011 | Desai | |
| 8,078,111 B2 | 12/2011 | Jovicic et al. | |
| 8,229,087 B2 | 7/2012 | Sumioka et al. | |
| 8,254,296 B1 | 8/2012 | Lambert | |
| 8,310,967 B1 | 11/2012 | Goel | |
| 8,340,034 B1 | 12/2012 | Lee | |
| 8,472,427 B1 | 6/2013 | Wheeler et al. | |
| 2004/0192222 A1 | 9/2004 | Vaisanen et al. | |
| 2005/0025174 A1 | 2/2005 | Fischer et al. | |
| 2005/0174962 A1 | 8/2005 | Gurevich | |
| 2006/0079232 A1 | 4/2006 | Omori et al. | |
| 2006/0268756 A1 | 11/2006 | Wang et al. | |
| 2007/0014314 A1 | 1/2007 | O'Neil | |
| 2007/0223430 A1 | 9/2007 | Desai et al. | |
| 2008/0139212 A1 | 6/2008 | Chen et al. | |

(Continued)

FOREIGN PATENT DOCUMENTS

| | | |
|---|---|---|
| EP | 1860827 | 11/2007 |
| WO | WO-2006090254 | 8/2006 |

(Continued)

OTHER PUBLICATIONS

"Final Office Action", U.S. Appl. No. 12/484,563, Apr. 24, 2012, 18 pages.
"Final Office Action", U.S. Appl. No. 12/616,454, Apr. 11, 2012, 19 pages.
"International Search Report and Written Opinion", PCT Application PCT/US2012/035597, Aug. 6, 2012, 13 pages.

(Continued)

*Primary Examiner* — Alex Skripnikov

(57) ABSTRACT

The present specification describes techniques for packet exchange arbitration. In some embodiments, a request is maintained to an arbiter at least until a packet exchange has been communicated and/or at least until a time-sensitive packet is communicated. In some other embodiments, a grant of a request is delayed at least until the communication of an isochronous packet.

20 Claims, 5 Drawing Sheets

(56) References Cited

U.S. PATENT DOCUMENTS

| | | |
|---|---|---|
| 2008/0161031 A1 | 7/2008 | Tu |
| 2008/0181154 A1 | 7/2008 | Sherman |
| 2008/0232287 A1 | 9/2008 | Shao et al. |
| 2008/0279163 A1 | 11/2008 | Desai |
| 2009/0137206 A1 | 5/2009 | Sherman et al. |
| 2009/0196210 A1 | 8/2009 | Desai |
| 2009/0239471 A1 | 9/2009 | Tran et al. |
| 2009/0245279 A1 | 10/2009 | Wan et al. |
| 2009/0247217 A1 | 10/2009 | Hsu et al. |
| 2010/0029325 A1 | 2/2010 | Wang et al. |
| 2010/0069112 A1 | 3/2010 | Sun et al. |
| 2010/0130129 A1 | 5/2010 | Chang et al. |
| 2010/0316027 A1 | 12/2010 | Rick et al. |
| 2011/0007675 A1 | 1/2011 | Chiou et al. |
| 2011/0009074 A1 | 1/2011 | Hsu et al. |
| 2011/0097998 A1 | 4/2011 | Ko et al. |
| 2012/0276938 A1 | 11/2012 | Wagholikar et al. |
| 2014/0044106 A1 | 2/2014 | Bhagwat |

FOREIGN PATENT DOCUMENTS

| | | |
|---|---|---|
| WO | WO-2007008981 | 1/2007 |
| WO | WO-2008707777 | 6/2008 |
| WO | WO-2009101567 | 8/2009 |
| WO | WO-2013119810 | 8/2013 |

OTHER PUBLICATIONS

"Non-Final Office Action", U.S. Appl. No. 12/484,563, Oct. 4, 2011, 13 pages.

"Non-Final Office Action", U.S. Appl. No. 12/732,036, Aug. 9, 2012, 13 pages.

"Non-Final Office Action", U.S. Appl. No. 12/616,454, Dec. 22, 2011, 8 pages.

"Notice of Allowance", U.S. Appl. No. 12/616,454, Aug. 22, 2012, 4 pages.

"Notice of Allowance", U.S. Appl. No. 12/484,563, Jul. 9, 2012, 6 pages.

"Notice of Allowance", U.S. Appl. No. 12/716,569, Apr. 19, 2012, 7 pages.

"Notice of Allowance", U.S. Appl. No. 12/732,036, Feb. 21, 2013, 8 pages.

"PCT Search Report and Written Opinion", Application No. PCT/US2013/025144, Jun. 5, 2013, 10 pages.

"Supplemental Notice of Allowance", U.S. Appl. No. 12/716,569, Jul. 23, 2012, 2 pages.

"Non-Final Office Action", U.S. Appl. No. 13/673,363, Nov. 29, 2013, 12 pages.

"Non-Final Office Action", U.S. Appl. No. 13/722,354, Jan. 17, 2014, 17 pages.

"Notice of Allowance", U.S. Appl. No. 13/673,363, Mar. 24, 2014, 4 pages.

"Notice of Allowance", U.S. Appl. No. 13/722,354, May 15, 2014, 4 pages.

PACKET EXCHANGE ARBITRATION FOR COEXISTING RADIOS

RELATED APPLICATIONS

This application is a continuation of and claims priority to U.S. Utility application Ser. No. 12/732,036, filed Mar. 25, 2010 which claims priority to U.S. Provisional Patent Application Ser. No. 61/166,985 filed Apr. 6, 2009, the disclosure of which is incorporated by reference herein in its entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

Wireless communication devices typically employ multiple radio modules to communicate with multiple wireless networks. These devices, however, often have fewer antennas than radio modules. In such a case, an arbiter allows the multiple radio modules to timeshare an antenna. An antenna switch, controlled by the arbiter, connects an antenna to one of the radio modules for wireless communication. Arbitration is usually performed on a per-packet basis, a packet being a basic unit of wireless communication. Some wireless communications, however, include packet exchanges that span multiple packets. Accordingly, when an arbiter switches an antenna from one radio module to another radio module prior to a packet exchange ending, the packet exchange is interrupted.

SUMMARY

This summary is provided to introduce subject matter that is further described below in the Detailed Description and Drawings. Accordingly, this Summary should not be considered to describe essential features nor used to limit the scope of the claimed subject matter.

A method is described for initiating a request to an arbiter for access to an antenna, communicating a packet via the antenna as part of a packet exchange, and maintaining the request to the arbiter at least until the packet exchange has been communicated.

Another method is described for determining that a time-sensitive packet is scheduled for communication during an upcoming time slot, initiating a request to an arbiter for access to an antenna, receiving a grant of the request, and maintaining the request to the arbiter at least until communication of the time-sensitive packet.

Still another method is described for determining that a first request for access to an antenna is requesting to communicate a first packet non-isochronously, determining that a second request for access to an antenna is requesting to communicate a second packet isochronously, determining that the first request and the second request are in contention, and delaying a grant of the first request until communication of the second packet.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques for arbitration on a per-packet basis may switch an antenna from one radio module to another radio module prior to a packet exchange ending, thus potentially interrupting the packet exchange. This disclosure describes techniques for packet exchange arbitration.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

Figure 1:
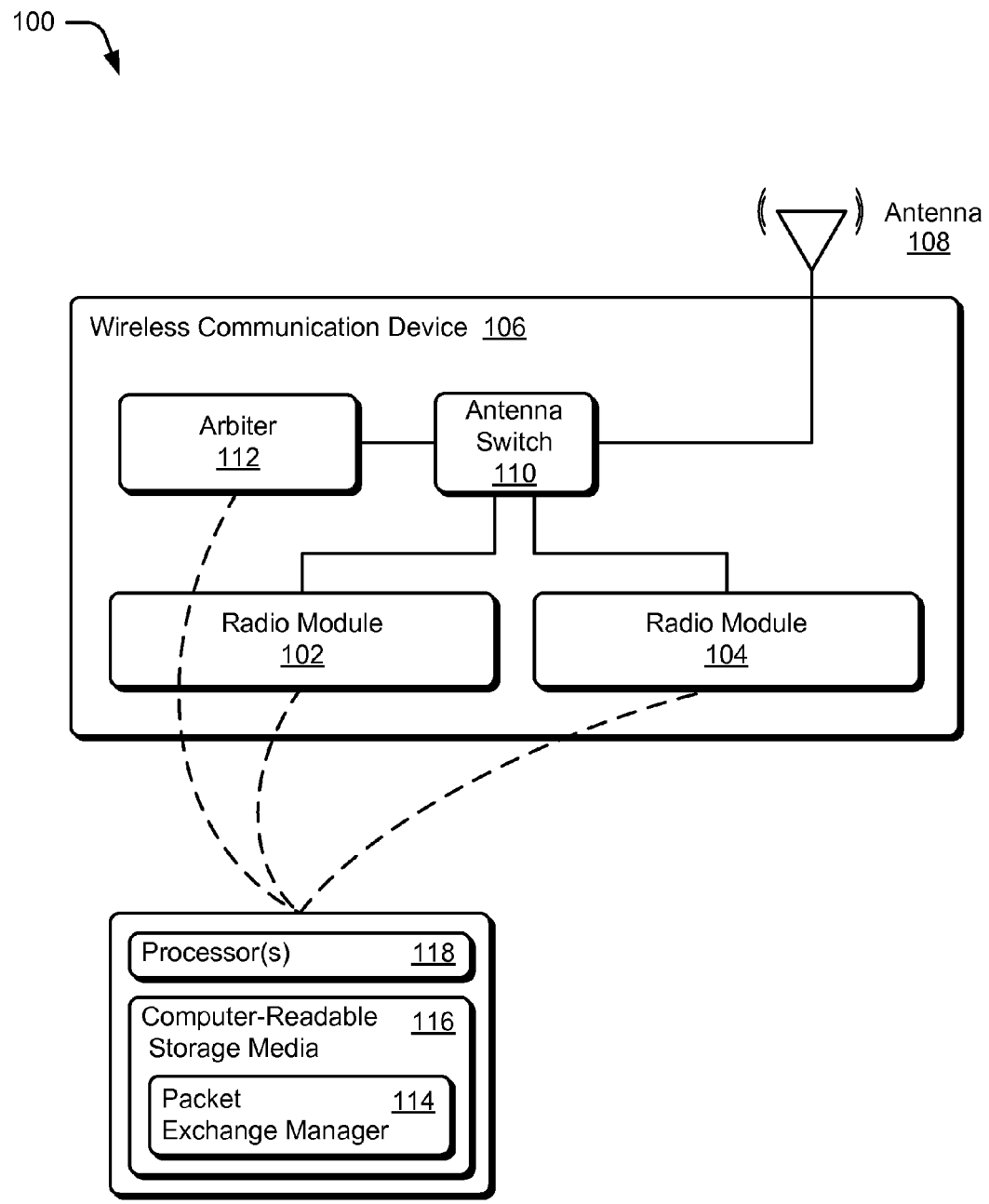
FIG. 1 illustrates an operating environment having radio modules in accordance with one or more embodiments.

FIG. 1 illustrates an operating environment 100 having radio modules 102 and 104 as components of wireless communication device 106. Radio modules 102 and 104 are each capable of transmitting and receiving wireless communications. Wireless communications of radio modules 102 and 104 may comprise isochronous and/or non-isochronous packets. Isochronous packets are communicated during scheduled time slots.

Radio module 102 is a wireless local area network (LAN) radio for communication according to a wireless LAN protocol. Radio module 104 is a short-range wireless radio for communication according to a personal-area-network protocol, such as Bluetooth™. When communicating according to the Bluetooth™ protocol, radio module 104 may communicate using various Bluetooth profiles including adaptive audio distribution (A2DP), dial-up networking (DUN), personal area networking (PAN), and object push (OPP) to name a few. Antenna 108 is timeshared between radio modules 102 and 104. When connected to antenna 108, each radio module 102, 104 may communicate packets over a wireless network. Connection of antenna 108 to radio module 102 or radio module 104 is made via antenna switch 110. Antenna switch 110 is controlled by arbiter 112, which is configured to arbitrate access of antenna 108.

Radio modules 102 and 104 request access to antenna 108 to communicate packets. Packet communications of radio modules 102 and 104 are asynchronous from each other, which can result in contending requests to transmit and/or receive packets via antenna 108. Arbiter 112 arbitrates contending requests for access to antenna 108, granting one request at a time. Arbitration can be based on various parameters, such as a priority level associated with a request. Requests that are not granted can cause a requesting radio module to abort, delay, or retry packet communications.

Antenna switch 110 connects a radio module to antenna 108 while arbiter 112 grants the request of the radio module.

The connected radio module may then communicate via antenna 108 until the grant ends. In one embodiment, arbiter 112 is configured to end a grant of a request responsive to receiving a contending request having a higher associated priority level. When a grant of a request ends prior to completion of a packet exchange, a radio module may cancel the incomplete packet exchange or attempt to re-communicate the incomplete packet exchange.

Radio modules 102 and 104 may each include a packet exchange manager 114, which can be embodied separately and distinctly on each respective radio module. Alternately or additionally, packet exchange manager 114 is embodied on other components of wireless communication device 106, such as arbiter 112.

Packet exchange manager 114 includes computer-executable instructions stored on computer-readable storage media 116. When executed by one or more processors 118, a component on which packet exchange manager 114 is embodied acts according to those instructions. Packet exchange manager 114 acts independently and/or in conjunction with various other entities of wireless communication device 106, such as by being firmware integrated into a System-on-Chip (SoC) having or communicating with antenna switch 110 and arbiter 112.

Techniques of Packet Exchange Arbitration

The following discussion describes techniques of packet exchange arbitration. These techniques can be implemented using the previously described environment, such as by packet exchange manager 114 of FIG. 1 embodied on arbiter 112 or radio modules 102 and/or 104. These techniques include methods illustrated in FIGS. 2, 3, and 4, each of which is shown as a set of operations performed by one or more entities. These methods are not necessarily limited to the orders shown for performing the operations. Further, these methods may be used in conjunction with one another whether performed by the same entity, separate entities, or any combination thereof. In portions of the following discussion, reference will be made to operating environment 100 of FIG. 1 by way of example. Such reference is not to be taken as limited to operating environment 100 but rather as illustrative of one of a variety of examples.

Figure 2:
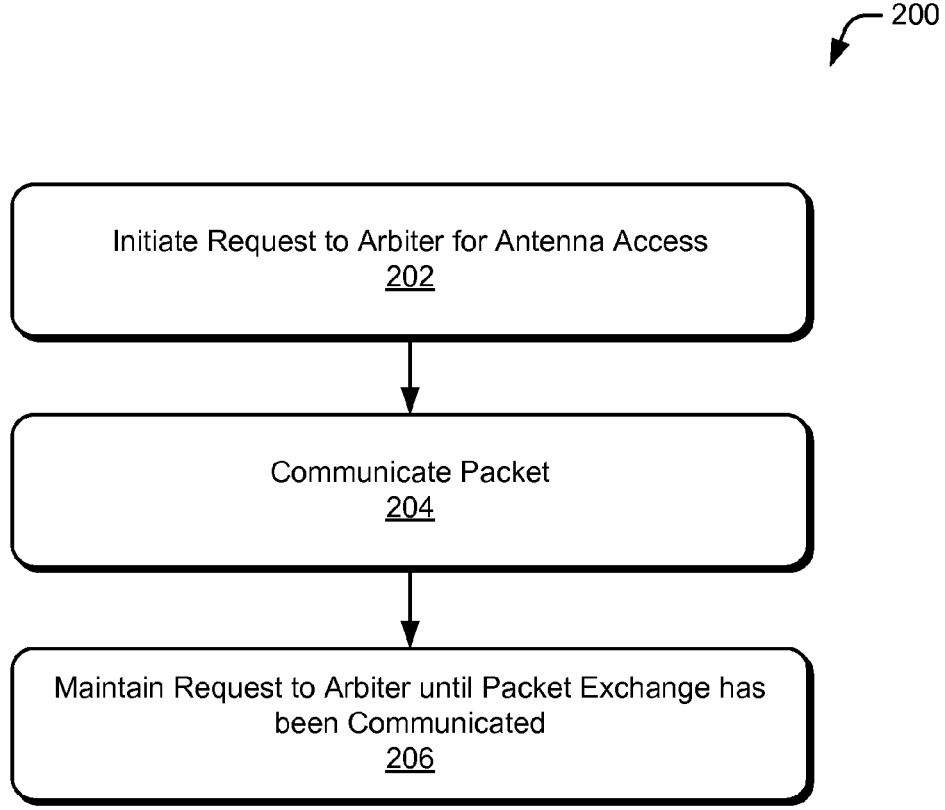
FIG. 2 illustrates a method for maintaining a request to an arbiter until a packet exchange has been communicated in accordance with one or more embodiments.

FIG. 2 depicts a method 200 for packet exchange arbitration. Method 200 maintains a request to an arbiter until a packet exchange has been communicated. Operations of method 200 can be performed by packet exchange manager 114 of FIG. 1, which will be used to describe particular implementations and embodiments of this method.

At 202, a first radio module initiates a request to an arbiter for access to an antenna. The request may have a priority level affecting access to the antenna.

At 204, a packet is communicated with the first radio via the antenna as part of a packet exchange. The packet exchange can comprise any number of packets, transmitted and/or received, via the antenna. In some instances the packet may be communicated responsive to receiving a grant of the request. The grant of the request indicates access to the antenna. Access to the antenna continues until the grant of the request ends. In some instances, a grant is received responsive to the request having a higher priority level than a contending request.

At 206, the first radio module continues to maintain the request to the arbiter, such as by packet exchange manager 114, at least until the packet exchange ends. The packet exchange ends once all of the packets of the packet exchange have been communicated. In one embodiment, maintaining the request to the arbiter is responsive to determining that the communicated packet is part of a packet exchange. In some instances, maintaining the request to the arbiter is effective to prevent another radio module from obtaining access to the antenna, interrupting the packet exchange. Packet exchange manager 114 can maintain the request until a response packet is received from a remote entity via the antenna, for example, or until a request timeout occurs.

Optionally as part of 206, packet exchange manager 114 changes the priority level of the request for a remaining duration of the packet exchange. For instance, packet exchange manager 114 may change the priority level of the request responsive to determining that the packet exchange has a priority level different from the communicated packet. In other instances, the priority level of the request remains constant during the packet exchange.

Initiating and maintaining the request for antenna access during method 200 uses a common signal or line, different signals, or separate lines.

Figure 3:
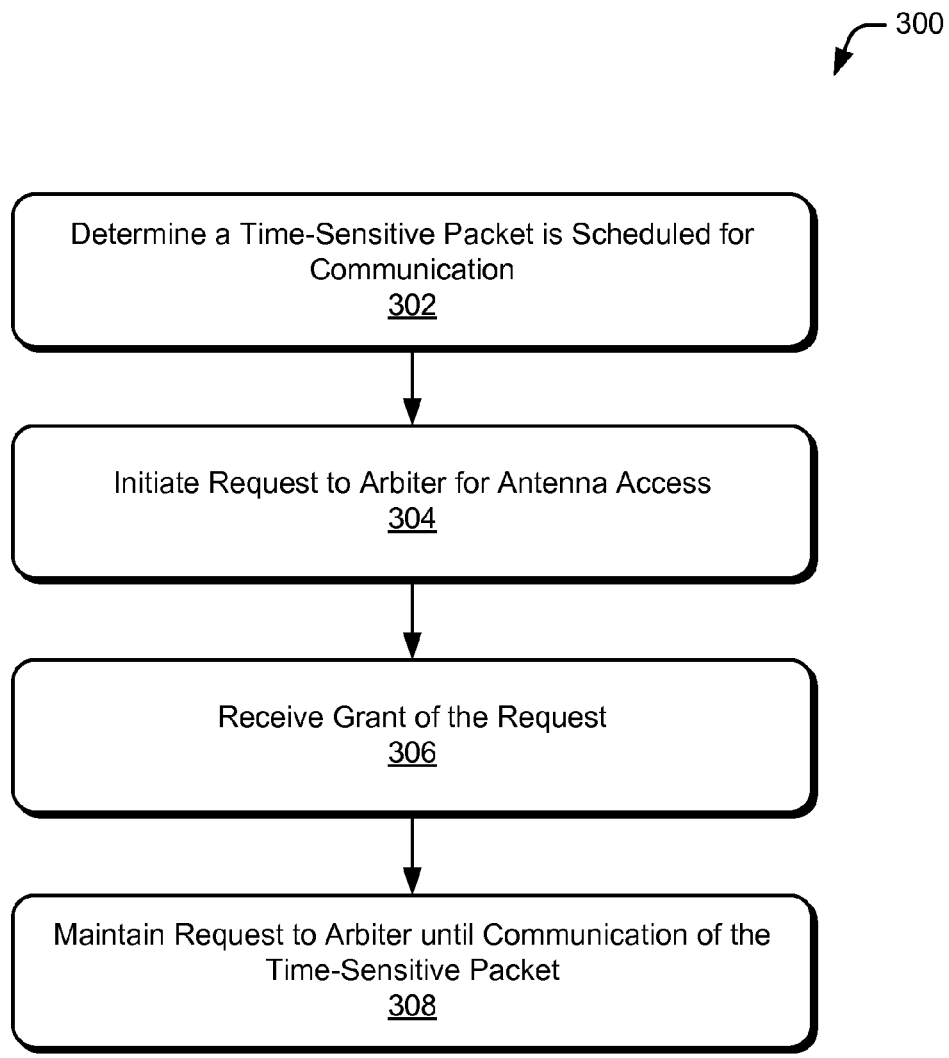
FIG. 3 illustrates a method for maintaining a request to an arbiter until communication of a time-sensitive packet in accordance with one or more embodiments.

FIG. 3 depicts a method 300 for packet exchange arbitration. Method 300 maintains a request to an arbiter until a time-sensitive packet is communicated. Operations of method 300 can be performed by packet exchange manager 114 of FIG. 1.

At 302, it is determined that a time-sensitive packet is scheduled for communication during an upcoming time slot. The upcoming time slot can be the next or any subsequent time slot. A short-range wireless radio, such as a radio communicating according to Bluetooth™ protocol, may schedule time-sensitive packets for communication during upcoming time slots of a synchronous connection oriented (SCO) link communication, which packet exchange manager 114 determines. In some instances, the radio communicating according to Bluetooth™ protocol may schedule a time-sensitive packet, such as an asynchronous connectionless link (ACL) packet, for communication at a time likely to cause cancellation of packet communications of another radio.

At 304, a request is initiated to an arbiter for access to an antenna. The request may include a priority level affecting arbitration. The priority level of the request corresponds to the priority level of the packet, is set to a default level, or is determined by an escalation algorithm. The escalation algorithm can increase the priority level of a request responsive to not receiving a grant of an initial or prior request. Alternately or additionally, the escalation algorithm may also increase the priority level of a request responsive to a grant of the request ending during packet communication. For instance, a priority level of a request can be increased after each failed attempt to communicate a packet via the antenna.

At 306, a grant of the request is received, indicating access to an antenna. Access to the antenna continues until the grant of the request ends. The grant of the request may end responsive to arbitration with a contending request of higher priority.

At 308, the request is maintained to the arbiter by packet exchange manager 114 at least until the time-sensitive packet can be communicated. In one embodiment, maintaining the request to the arbiter is responsive to determining that the time-sensitive packet is scheduled for communication during an upcoming time slot. In some instances, maintaining the request to the arbiter is effective to prevent another radio module from starting communication of a packet or packet exchange that will be interrupted by the time-sensitive packet scheduled for the upcoming time slot. In one embodiment, packet exchange manager 114 maintains the request until the start, middle, or end of the upcoming time slot.

While the request is maintained at 308, the time-sensitive packet is communicated via the antenna. Packet exchange manager 114 ceases to maintain the request responsive to an indication that the time-sensitive packet is communicated or after a period of time.

Figure 4:
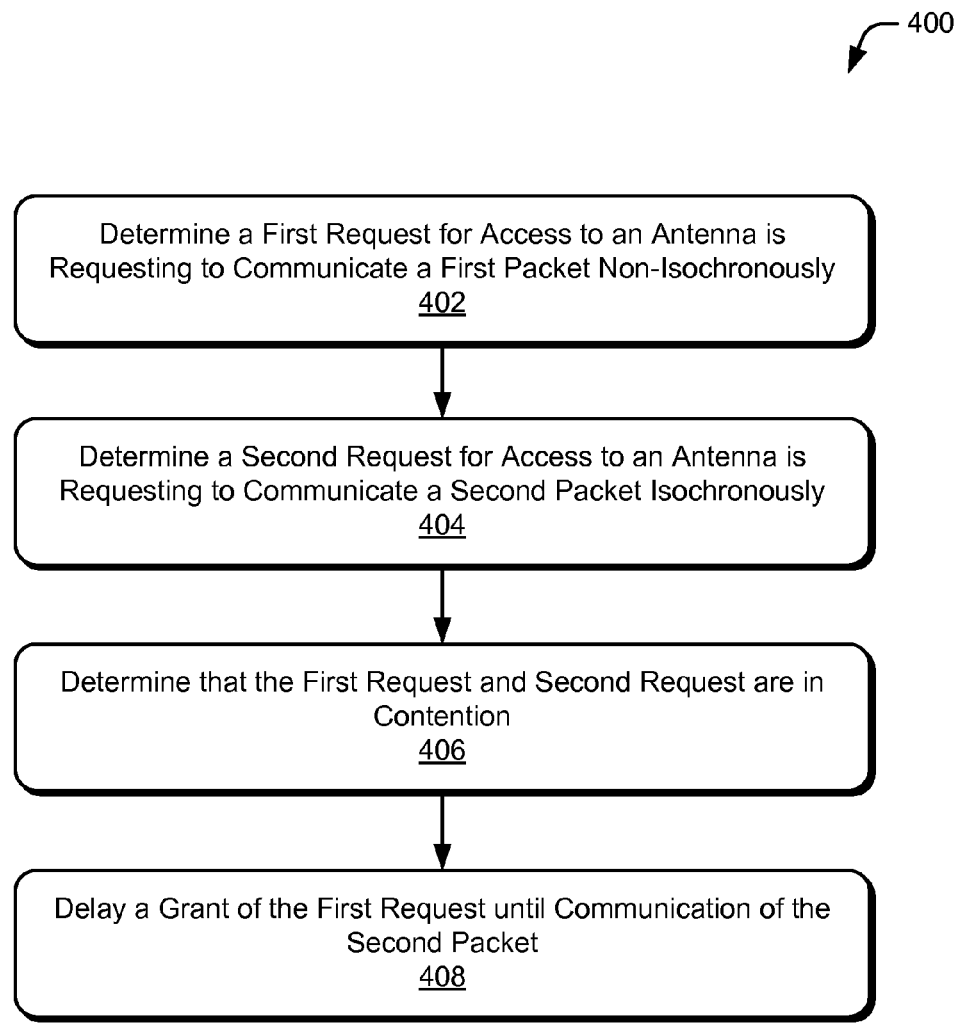
FIG. 4 illustrates a method of delaying a grant of a request until communication of a packet in accordance with one or more embodiments.

FIG. 4 depicts a method 400 for packet exchange arbitration. Method 400 delays a grant of a request until communication of an isochronous packet. Operations of method 400 can be performed by packet exchange manager 114 of FIG. 1.

At 402, it is determined that a first request for access to an antenna is requesting to communicate a first packet non-isochronously. An indication that the first packet is non-isochronous may be part of the first request, multiplexed within the first request, or within a separate signal. The first request can be analyzed by packet exchange manager 114 embodied on arbiter 112, either radio module 102, 104, or some other location in wireless communication device 106.

At 404, it is determined that a second request for access to an antenna is requesting to communicate a second packet isochronously. An indication that the second packet is isochronous may be part of the second request, multiplexed within the second request, or a separate signal. In some instances, the request may indicate communication of the isochronous packet is scheduled for an upcoming time slot. In at least some embodiments, priority levels associated with isochronous packets are higher than priority levels associated with non-isochronous packets, resulting in the cancellation of contending non-isochronous packet communications due to arbitration. The second request is received at arbiter 112, by a component of wireless communication device 106 residing communicatively between arbiter 112 and radio module 102 or 104, or one of radio modules 102 or 104. Thus, the second request can be analyzed by packet exchange manager 114 embodied on arbiter 112, either radio module 102, 104, or some other location in wireless communication device 106.

At 406, it is determined that the first request and the second request are in contention. Contention can be determined by arbiter 112 when both the first request and the second request are requesting access to an antenna contemporaneously. In other instances, contention of the first request and the second request is determined prior to either or both requests being received by arbiter 112.

At 408, a grant of the first request is delayed, e.g., by packet exchange manager 114, at least until communication of the second packet. Delaying the grant of the first request is effective to prevent communication of the first packet from being interrupted by communication of the second packet. Packet exchange manager 114 can delay the grant of the first request at arbiter 112 until communication of the second packet or delay the grant of the first request by delaying the first request at one of the radio modules 102, 104. Thus, packet exchange manager 114 ceases, at some point, to delay the grant of the first request, such as responsive to an indication that the second packet is communicated.

After packet exchange manager 114 ceases to delay the grant of the first response at 408, the first packet may be communicated responsive to a grant of the first request. Packet exchange manager 114 can repeat operations 402, 404, 406, and 408 effective to reduce contending requests by aligning non-isochronous packets and isochronous packet communication.

System-on-Chip

Figure 5:
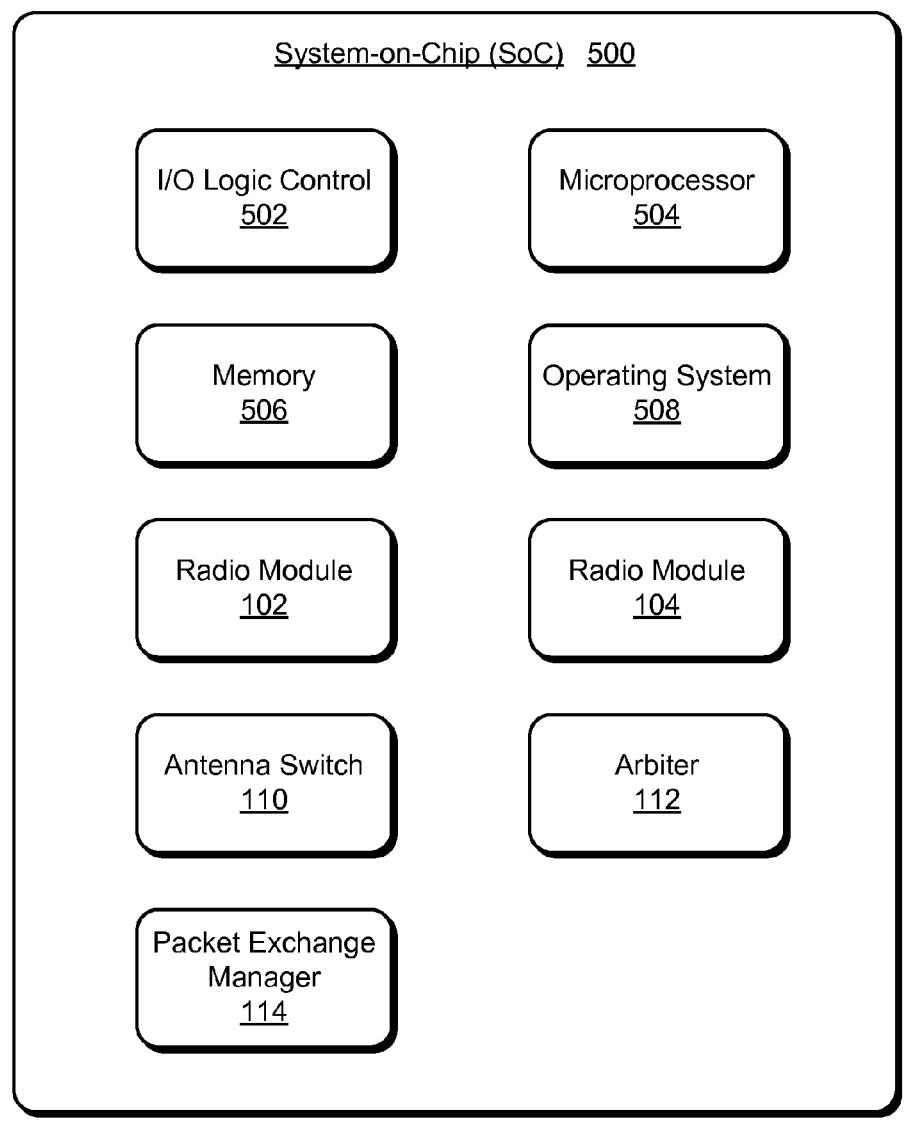
FIG. 5 illustrates a System-on-Chip (SoC) environment for implementing embodiments of the techniques described herein.

FIG. 5 illustrates a System-on-Chip (SoC) 500, which can implement various embodiments described above. A SoC can be implemented in a fixed or mobile device, such as a computing device, game console, camera, printer, cell phone, digital video recorder, picture frame, and/or any other type of device that may communicate with multiple wireless networks.

SoC 500 can be integrated with electronic circuitry, a microprocessor, memory, input-output (I/O) logic control, communication interfaces and components, other hardware, firmware, and/or software needed to run an entire device. SoC 500 can also include an integrated data bus (not shown) that couples the various components of the SoC for data communication between the components. A wireless communication device that includes SoC 500 can also be implemented with many combinations of differing components.

In this example, SoC 500 includes various components such as an input-output (I/O) logic control 502 (e.g., to include electronic circuitry) and a microprocessor 504 (e.g., any of a microcontroller or digital signal processor). SoC 500 also includes a memory 506, which can be any type of random access memory (RAM), a low-latency nonvolatile memory (e.g., flash memory), read only memory (ROM), and/or other suitable electronic data storage. SoC 500 can also include various firmware and/or software, such as an operating system 508, which can be computer-executable instructions maintained by memory 506 and executed by microprocessor 504. SoC 500 can also include other various communication interfaces and components, wireless communication components, other hardware, firmware, and/or software.

SoC 500 includes radio modules 102 and 104, antenna switch 110, arbiter 112, and packet exchange manager 114. Examples of these various components, functions, and/or entities, and their corresponding functionality, are described with reference to the respective components of the environment 100 shown in FIG. 1.

Packet exchange manager 114 in SoC 500, either independently or in combination with other entities, can be implemented as computer-executable instructions maintained by memory 506 and executed by microprocessor 504 to implement various embodiments and/or features described herein. Packet exchange manager may also be provided integral with other entities of the SoC, such as integrated with one or both of radio modules 102 and 104, or arbiter 112. Alternatively or additionally, packet exchange manager and the other components can be implemented as hardware, firmware, fixed logic circuitry, or any combination thereof that is implemented in connection with the I/O logic control 502 and/or other signal processing and control circuits of SoC 500.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
    determining that a time-sensitive packet of a first radio module is scheduled for communication during a time slot, the time slot being an upcoming time slot in a series of time slots for time-sensitive communications of the first radio module;
    initiating, to an arbiter and before a start of the time slot, a request for access to an antenna, the arbiter configured to arbitrate, based on priority levels, access to the antenna between the first radio module a second radio module, a priority level of the time-sensitive communications of the first radio module being higher than a priority level of communications of the second radio module; and
    maintaining the request to the arbiter at least until the start of the time slot effective to prevent the second radio module from initiating, before the start of the time slot, communications other than communication of the time-sensitive packet that would be disrupted by communication of the time-sensitive packet during the time slot.

2. The method of claim 1, further comprising receiving, from the arbiter, a grant of the request effective to enable the first radio module to communicate the time-sensitive packet via the antenna.

3. The method of claim 1, wherein the first radio module comprises a short-range wireless radio, and the second radio module comprises a wireless local area network radio.

4. The method of claim 3, wherein the short-range wireless radio is configured to communicate according to a personal-area-network protocol, and the wireless local area network radio is configured to communicate according to a protocol compliant with an IEEE 802.11 standard.

5. The method of claim 1, wherein the request to the arbiter from the first radio module indicates a priority level associated with the time-sensitive packet.

6. The method of claim 5, wherein the priority level associated with the time-sensitive packet is a default priority level or an increased priority level set by an escalation algorithm.

7. The method of claim 1, further comprising, responsive to communicating the time-sensitive packet, ceasing to maintain the request to the arbiter.

8. The method of claim 1, wherein the request to the arbiter is maintained until the start, a middle, or an end of the time slot during which the time-sensitive packet is transmitted.

9. A communication device comprising:
a first radio module;
a second radio module;
an arbiter configured to arbitrate access to an antenna between the first radio module and the second radio module; and
a packet exchange manager, the packet exchange manager configured to:
 determine that a time-sensitive packet of the first radio module is scheduled for communication during a time slot, the time slot being an upcoming time slot in a series of time slots for time-sensitive communications;
 initiate, to the arbiter and before a start of the time slot, a request for access to the antenna; and
 maintain the request to the arbiter at least until the start of the time slot effective to prevent the second radio module from initiating, before the start of the time slot, communications other than communication of the time-sensitive packet that would be disrupted by communication of the time-sensitive packet during the time slot.

10. The communication device of claim 9, wherein the first radio module comprises a short-range wireless radio, and the second radio module comprises a wireless local area network radio.

11. The communication device of claim 10, wherein the short-range wireless radio is configured to communicate according to a personal-area-network protocol, and the wireless local area network radio is configured to communicate according to a protocol compliant with an IEEE 802.11 standard.

12. The communication device of claim 9, wherein the arbiter is further configured to arbitrate access to the antenna based on a priority level associated with requests received by the arbiter.

13. The communication device of 12, wherein a priority level associated with the time-sensitive packet is higher than another priority level associated with communications of the second radio module.

14. The communication device of claim 9, wherein the communication device is one of a media device, communication device, computer device, gaming device, photography device, electronic device, or a portable phone.

15. One or more computer-readable storage devices comprising processor-executable instructions that, responsive to execution by a processor, implement a packet exchange manager to:
 determine that a time-sensitive packet of a first radio module is scheduled for communication during a time slot, the time slot being an upcoming time slot in a series of time slots for time-sensitive communications;
 initiate, to an arbiter and before a start of the time slot, a request for access to an antenna, the arbiter configured to arbitrate access to the antenna between the first radio module a second radio module;
 receive, from the arbiter, a grant of the request effective to enable the first radio module to communicate the time-sensitive packet via the antenna; and
 maintain the request to the arbiter at least until the start of the time slot effective to prevent the second radio module from initiating, before the start of the time slot, communications other than communication of the time-sensitive packet that would be disrupted by communication of the time-sensitive packet during the time slot.

16. The computer-readable storage devices of claim 15, wherein the first radio module comprises a short-range wireless radio, and the second radio module comprises a wireless local area network radio.

17. The computer-readable storage devices of claim 16, wherein the short-range wireless radio is configured to communicate according to a personal-area-network protocol, and the wireless local area network radio is configured to communicate according to a protocol compliant with an IEEE 802.11 standard.

18. The computer-readable storage devices of claim 15, wherein the request has a priority level higher than another priority level of a request from the second radio module effective to prevent a grant of the request from the second radio module.

19. The computer-readable devices of claim 15, wherein maintaining the request to the arbiter at least until the start of the time slot is effective to prevent the second radio module from initiating a packet exchange of multiple packets.

20. The one or more computer-readable storage devices of claim 15, wherein the packet exchange manager is embodied, in whole or part, on the first radio module or the arbiter.

\* \* \* \* \*